Dec. 12, 1967        W. J. KENNEDY, JR        3,357,874
PROCESS FOR TREATING POLYESTER FILMS
Filed Feb. 27, 1964        2 Sheets-Sheet 1

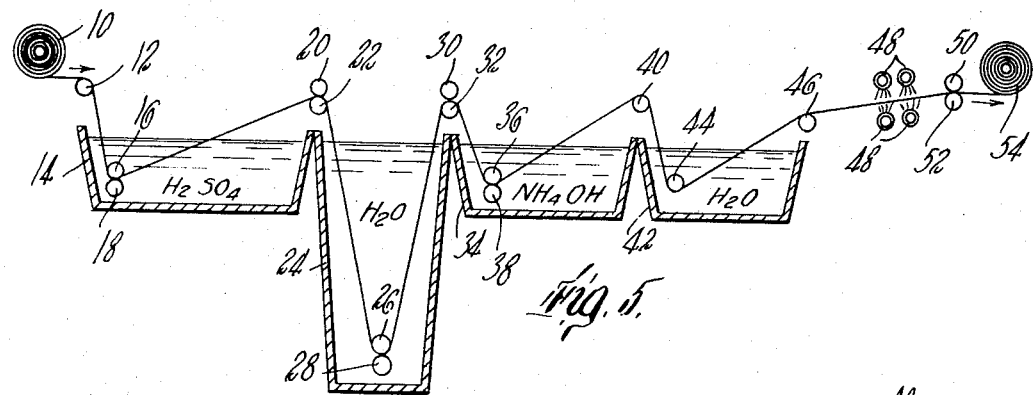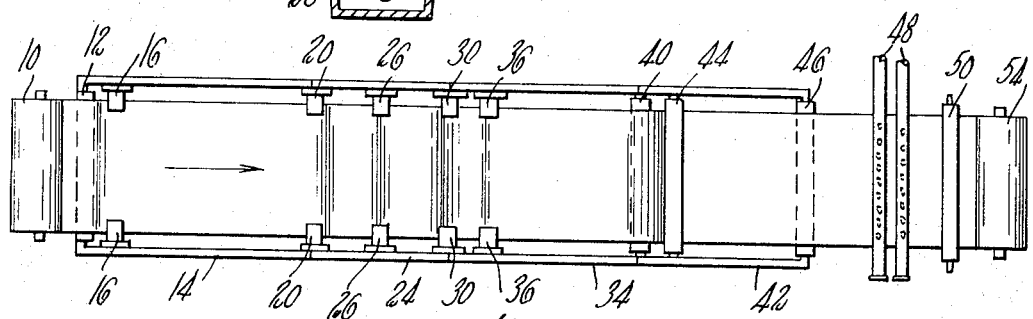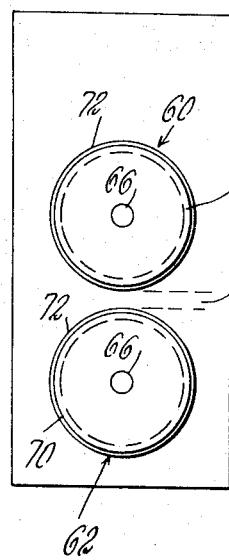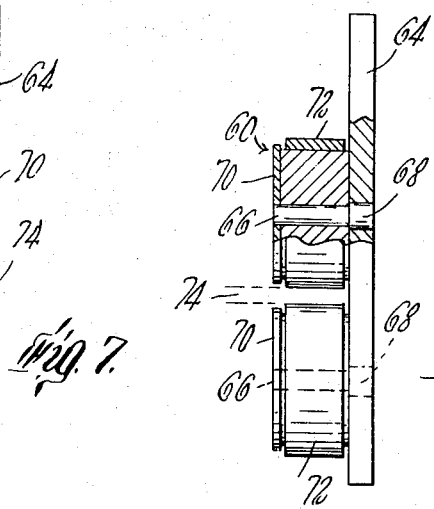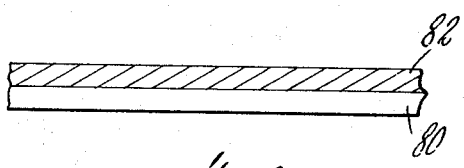

United States Patent Office 3,357,874
Patented Dec. 12, 1967

3,357,874
PROCESS FOR TREATING POLYESTER FILMS
William J. Kennedy, Jr., Charlotte, N.C., assignor to The Kendall Company, Boston, Mass., a corporation of Massachusetts
Filed Feb. 27, 1964, Ser. No. 347,781
18 Claims. (Cl. 156—308)

A shaped article such as a film, foil, ribbon, or fabric, composed at least in part of crystalline polyethyleneterephthalate, is exposed to the action of chlorosulfonic acid or 85% sulfuric acid, after which it is quenched, as in water. This causes a white, opaque deposit of amorphous polyethyleneterephthalate to be formed on the surface of the article. This spongy amorphous deposit is heat-sensitive, and may be recrystallized to substantial transparency by heat. The spongy nature of the amorphous surface allows modifying material, such as fluids or finely divided solids, to be impregnated therein, whereupon heat treatment encapsulates the modifying material in the recrystallized film surface. Such heat-sensitivity also allows treated films to be laminated to a variety of substrates.

This invention relates to a process for treating a shaped article comprising polyethylene terephthalate to render its surface amorphous, and then heating the article so as to recrystallize the amorphous fraction of the polyester. More particularly, it relates to the process of conducting the recrystallization of the amorphous surface while said surface is in intimate contact with a second substance, whereby the second substance is encapsulated in or laminated to said surface. This application is a continuation-in-part of my application Ser. No. 210,999, filed July 19, 1962 and now abandoned.

By shaped article is meant films, foils, ribbons, fibers, yarns, woven or non-woven fabrics and the like, composed at least in part from a glycol and terephthalic acid. Such polyester products are known as Dacron (Du Pont) or Terylene (Imperial Chemical Industries) when in fiber or filament form, and as Mylar (Du Pont) or Melinex (Imperial Chemical Industries) when in the form of film. The examples and specification will be illustrated with special reference to polyethylene terephthalate film. The specification of this invention will set forth its utility in the preparation of laminates, as well as its broader utility in effecting the adhesion of any second substance to a polyester film surface by an embedding process.

STATE OF THE ART

The normal polyester film of commerce, as typified by material known to the trade as Mylar, a trademark for Du Pont's polyethylene terephthalate film, has very desirable properties as an ingredient of laminates, especially for the electrical industry. Films of this general class are characterized by high physical strength, dielectric strength, chemical resistance, and solvent resistance. Such films, however, have a high degree of crystallinity, and are marked by an abrupt melting point. Materials with more or less sharp melting points, and which do not have a relatively broad temperature range at which they soften and become adhesive, are very difficult to heat-seal. In the case of Mylar film, at the temperature necessary to effect surface fusion for the formation of a heat-sealed laminate, serious dimensional changes occur, and the film is hard to control. As a result, Mylar film is generally regarded as non-heat-sealable without the use of additives. This is a decided disadvantage in polyester films, since in laminating applications in general, heat-sealability is an obviously desirable property where films are to be sealed surface-to-surface, laminated to other films, or to paper, or fibrous webs, or non-woven fabrics, and the like. Such self-sealed, laminated, or compounded uses account for a substantial proportion of film consumption.

In the past, this difficulty has been overcome by several methods. One such method, as disclosed by William Mayo Smith, Jr., in U.S. Patent No. 2,849,359, is to coat the surface of the films with substances having an incipient plasticizing action on these high polymer films, which allows the films to be sealed to one another at temperatures substantially lower than their melting points. This method provides for the sealing of film to film, but does not provide for the sealing of these films to other surfaces. This method also has the disadvantage of requiring the application of the incipient plasticizer at the time the film is to be sealed, which is a limitation on the process. In addition, the plasticizer may be an undesirable contaminant in the system for many applications.

Films of polyethylene terephthalate or other such films can be laminated together by various adhesive systems, but the use of adhesives often introduces undesirable components, with different chemical, mechanical or electrical properties, into laminates thus formed. A common laminate is the combination of polyethylene terephthalate film, with polyethylene terephthalate fibrous non-woven mats. These laminates are combined by suitable adhesive systems and the mat portion of the laminate is capable of absorbing large quantities of electrical varnish and resin. If the laminate is formed by combining the fibrous mat with a Mylar film through an adhesive system, the resins used to hold the mat to the film may form an undesirable interface in the electrical laminate. In addition, the bonding agent makes up much of the volume available for later saturating the fibers with desirable electrical varnishes and resins. It is a further disadvantage of adhesive-bonded laminates that the adhesive systems used tend to stiffen the product and thus make it difficult to wrap cables, wires, and other electrical components with the insulating material.

For these and for other reasons that will become apparent, it is desirable to treat Mylar film so that it will seal to itself or to other surfaces upon the application of nominal heat and pressure in the formation of laminates. Such laminates, in which bond is effected between a Mylar film and another sheet of material without the use of a secondary adhesive system, I refer to as being autogenously laminated.

OBJECTS OF THE INVENTION

It is therefore an object of this invention to prepare autogenous laminates of normally non-heat-sealing polyester film, such as Mylar.

It is a further object of this invention to prepare autogenous Mylar laminates by the use of pressure plus a degree of heat which is substantially below the melting point of the usual biaxially oriented Mylar film of commerce.

It is an additional object of this invention to prepare autogenously bonded Mylar laminates from a Mylar film so treated as to impart to at least one surface of said film a transient heat-sealability which disappears during the laminating process with the formation of a strong bond which is no longer heat-sensitive.

Still another object of this invention is to provide a process wherein at least one surface of a crystalline polyethylene terephthalate film is rendered amorphous, the amorphous surface is impregnated with a second substance, and the impregnated surface is then recrystallized to lock or embed the second substance therein.

Other objects of the invention will appear from the following description.

SUMMARY OF THE DRAWINGS

Both FIGURES 1 and 2 are magnified approximately 300 times; that is, they represent a film which is actually 0.003 inch thick.

FIGURE 5 is a side elevation of an apparatus suitable for carrying out the process of this invention.

FIGURE 6 is a view from above of the apparatus of FIGURE 5.

FIGURE 7 is a detailed front view of a bearing mechanism useful in the practice of this invention.

FIGURE 8 is a side elevation of the bearing of FIGURE 7.

FIGURE 9 is a stylized cross-section of a laminate of this invention showing a layer 80 of treated polyester film combined with a sheet 82 of other material, as described in Examples 1 to 4.

BRIEF SUMMARY OF THE INVENTION

Figure 1:
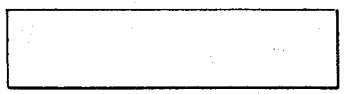
FIGURE 1 represents a stylized cross-sectional view of a strip of conventional polyester film.
Figure 2:
FIGURE 2 represents a stylized cross-sectional view of a polyester film treated according to my invention, showing the physically altered nature of the surface which is affected by the invention.

The basis of my invention lies in the discovery that if a film of polyester material such as polyethylene terepthalate is treated with an acid such as sulfuric or chlorosulfonic for a short time and is then quenched or neutralized, the surface of the film is rendered heat-sealing at temperatures as low as 150° F., whereas an untreated film will not heat-seal at 400° F. This surface change in softening point is marked by the surface of the film developing a chalky, opaque appearance, which disappears when the treated film is heat-sealed or calendered in the formation of a laminate, with the restoration of a transparent clarity characteristic of the untreated polyester film.

This phenomenon does not appear to be a function of acids in general, since it is my experience that treating a commercial polyethylene terephthalate film with concentrated nitric acid, concentrated hydrochloric acid, concentrated phosphoric acid, or glacial acetic acid, does not lead to the formation of a white surface deposit nor to the development of heat-sealability. Additionally, I have found that the sulfuric acid, which I prefer to use for its economy and convenience, must be of a certain minimum concentration to be effective. Sulfuric acid of a concentration between 85% and 100% will develop a heat-sealable opaque surface on a Mylar film when the acid is at room temperature. Concentrations substantially below 85% are generally ineffective at room temperature, although when concentrations below 85% are heated to temperatures in excess of 120° F., a white surface can be created on the Mylar film with sufficient exposure time. The surface thus formed, however, has a somewhat less desirable degree of heat-sealability than surfaces developed using sulfuric acid of 85% concentration or higher, said concentration being my preferred range.

NATURE OF THE FILM-TREATING PROCESS

If Mylar film is immersed in concentrated sulfuric or chlorosulfonic acid, the film apparently is rapidly attacked, and the polymer passes into solution accompanied by some degradation, with the formation of a clear, viscous solution. The viscosity of this solution decreases rather rapidly, due presumably to depolymerization. By quenching the solution in water, a material may be recovered the molecular weight of which can be estimated by measuring its intrinsic viscosity in a 1 to 1 solution of phenol and tetrachloroethane.

In one set of experiments, a Mylar film was selected which showed a molecular weight of 25,500 in the above solvent. A sample of such film was immersed in 95% sulfuric acid for 20 seconds, after which the film was drawn between two tightly impinging glass rods to remove the viscous solution on the surface, which was immediately quenched in water. The molecular weight of the material thus recovered was 14,500, indicating that the degradation had on the average effected less than one cleavage per polymeric molecule.

When the experiment was repeated with an exposure time of 20 minutes, the molecular weight of the recovered material had dropped to 2,100, or less than 10% of its initial value. It is important, therefore, that the exposure time of the film to the acid be controlled so as to minimize the loss of desirable polymeric characteristics, insofar as said polymeric characteristics are responsible for the desirable properties of the film.

The degree to which sulfuric acid will attack a given film, I have found, is a function of time of exposure, temperature and concentration of the acid, and film thickness. In this last connection, it should be realized that only the surface of the film is exposed to the acid, and therefore only a limited amount of polymer undergoes attack. I have found by experiments similar to the above, where the degree of attack can be measured by removing and weighing the solute, that 96% sulfuric acid penetrates into the surface of Mylar film at a rate, on the average, of approximately 0.01 mil or 0.00001 inch per second during the first minute of treatment, decreasing to a rate of approximately 0.004 mil or 0.000004 inch per second, after a five-minute exposure at room temperature. From this it can be readily seen that the volume of film actually affected by the treatment with acid is very small. I find that a treatment of five seconds in 96% acid at room temperature is sufficient to make the surface of the film heat-sealable.

In the case of a five mil film, the total amount of polymer in contact with acid amounts by calculation to approximately 2% of the total polymer available. If the duration of the treatment is lengthened to 30 seconds, the amount of polymer in contact with the acid can amount to approximately 12% of the total polymer available. The above figures are for acid at 96% concentration; where lower concentrations are used, the amount of polymer affected by treatment is accordingly reduced, since the rate of reaction is slower.

DETAILED DESCRIPTION OF THE FILM-TREATING PROCESS

A preferred method for carrying out the process of the invention is shown in FIGURES 5, 6, 7, and 8. Referring of FIGURE 5, a supply roll 10 of Mylar film is passed over a guide roll 12 into a tank or tray 14 containing sulfuric acid of the appropriate concentration, such as 96% at 25° C., being guided through the tank 14 by a special set of edge guides 16 and 18. The edges guides 16 and 18, as well as guides 20 and 22; 26 and 28; 30 and 32; and 36 and 38, are of a design particularly adapted for this purpose, and are more particularly described hereinbelow.

The acid-treated film is drawn out of the tank 14, through guide rolls 20 and 22, and into a preferably deeper tank 24 containing water or other quenching reagent, also at about 25° C. This tank is preferably deeper than the other tanks in the process to allow a longer path of travel of the film therethrough. It has been found that a long, uninterrupted quench promotes a smoothly treated surface free of streaks and unevenness.

In the tank 24 the film is reversed in direction by means of guide rolls 26 and 28, from which it passes over guides 30 and 32 and thence into a neutralizing bath, conveniently of dilute ammonia of 10% concentration, contained in tank 34. The film is guided through tank 34 by guide rolls 36 and 38.

By this stage of the process the treated surface of the film is stable, so that subsequent guides 40, 44, and 46 may be conventional rollers. These guides serve to conduct the film through and out of a rinsing water bath contained in tank 42. From guide roll 46 the water-wet treated film passes between sets of warm air jets 48, which I have found to be a convenient means for drying the film. It is desirable to keep the temperature of the warm air jets below 150° F., to discourage any transition of the treated surface to a crystalline or more highly oriented state, which presumptively would impair its heat-sealability.

From the warm air jets the dry film passes through a pair of rubber rolls 50 and 52 to the wind-up roll 54. Rolls 50 and 52 are driven by conventional means, not shown, and are the primary conveying force for the processing of the film. Rolls 50 and 52 are conveniently of medium durometer rubber, and exert enough pressure to allow the film to be processed at a constant, even rate but are not so hard that the treated surface is crushed or distorted.

It is obvious that tank 14 should be of acid-resistant material: I have found polyethylene to be quite suitable. It will also be obvious to one skilled in the art that constant-level devices will assist in maintaining the proper levels of treating fluid in the tanks. Such conventional make-up devices, fed from a make-up supply tank, are not shown. The water tanks 24 and 42 may be supplied with a constant input of water, excess being discharged through an overflow device. Such details likewise are conventional and are not shown.

With reference to the special edge guides 16, 18, 20, 22, 26, 28, 30, 32, 36, and 38, their construction is shown in more detail in FIGURES 7 and 8. As set forth above, the immediate action of the acid on the Mylar film is to form a solution of polymer, which is susceptible to being scraped off, streaked, or otherwise rendered irregular if the treated film is passed over or under conventional rollers which would create a dragging or scraping action. It is desirable, therefore, that the film during the sensitive stages of treatment be supported only at its edges. The rollers 62 and 64 are a convenient device for accomplishing this purpose.

Essentially, the rollers are sets of freely-revolving edge guides, 60 and 62, of acid-resistant material where necessary. A resistant core, 66, as of stainless steel, is bolted to a support member 64 by means of a threaded bolt 68 which also passes through a washer 70. This assembly is non-revolving. Around the core 66 there revolves a sleeve or shell 72, conveniently a section of acid-resistant plastic tubing. The washers 70 are of such dimensions that the film-contacting sleeves are held on the cores 66, but so that the sleeves rotate freely. The clearance shown between the film-contacting sleeves 72 and the cores 66 allows the sleeves to turn easily.

The width of the gap 74 between rolls is preferably several times the thickness of the film to be processed. This allows the film to be drawn through the process without the development of edge turbulence in the fluid, which might cause streaking or uneven action in the vicinity of the edge during the period when the heat-sealable layer is sensitive due to its viscous unset condition.

It may be pointed out at this juncture that in the guide rolls 16, 18, 20, 22, et seq. of FIGURE 5, each upper member, such as 16, refers to a pair of devices corresponding to the guide 60 of FIGURE 8, said pair being oppositely mounted on opposite sides of the tank. Similarly, the guide member 18 consists of an oppositely-disposed set of guides 62 of FIGURE 8, mounted below the pair of guides 60. The disposition of the guides may be more clearly understood from FIGURE 6, where the upper guides 16, 20, 26, 30, and 36 of FIGURE 5 are seen to consist of an oppositely-disposed pair of guides 60 of FIGURE 8. In the case of FIGURE 6, the lower guides 18, 22, 28, 32, and 38 of FIGURE 5 are each a pair of oppositely-disposed guides 62 of FIGURE 8. Since the guides are mounted directly over each other, the lower guides are not visible in FIGURE 6.

It is also possible to carry out the process of my invention by using other edge-holding devices such as small tenter clips to convey the film properly through the treating sequence. Other edge-holding devices will be apparent to those skilled in the art, the instant device being set forth as exemplary and convenient.

The process and apparatus as described above yield a film which is heat-sealable on both faces. In some instances, it may be desirable to develop heat-sealability on only one face of the film. This can be accomplished, in one method, by causing the film to fit tightly to a rotating drum which dips into the acid bath: if desired, an elastomeric seal or plastic gasket in the form of a continuous belt may be applied to the edges of the film, so that the treating acid is effectively prevented from entering the area of contact between the drum and the inside or unexposed face of the film. Similar expedients will be apparent to those skilled in the art of film processing.

The following examples illustrate the manner in which the invention may be carried out in the preparation of autogenously-bonded laminates.

*Example 1*

A sheet of Mylar film 0.003 inch thick was immersed in 96% sulfuric acid at room temperature for a period of five seconds, after which it was removed from the acid and immediately quenched in a bath of 10% aqueous ammonium hydroxide, also at room temperature. A white deposit was formed on both film surfaces as soon as it entered the quench bath. The film was then rinsed with water and blotted dry.

The double-faced film thus prepared was laminated by placing it between two sheets of a Dacron (trademark of E. I. du Pont Co.) non-woven fabric weighing about 80 grams per square yard, said fabric being 0.005 inch thick. The assembly was passed through a textile calender comprising a steel roll in contact with a paper roll, the steel roll being heated to 250° F. and the pressure being 200 pounds per inch of nip.

The two layers of non-woven fabric were found to be firmly adherent to the Mylar film, and could not be removed therefrom without extensive destruction of the fabric.

In a parallel test, a sheet of untreated Mylar film showed no adhesion to the layers of non-woven fabric, the assembly falling into three separate layers after calendering.

*Example 2*

A conventional laminate was prepared by coating both sides of a Mylar film 0.003 inch thick with an adhesive composed of equal parts of an epoxy resin (Gen Epoxy M180 made by General Mills) and a polyamide resin (Versamid 125, also made by General Mills), said resin being in a 50% solution in ethyl acetate. The resin coating, approximately 0.005 inch thick, was dried at 175° F. for three minutes. The film was then combined with two layers of the Dacron non-woven fabric of Example 1 by passing the assembly through the calender of Example 1 heated to 300° F. and at a pressure of 300 pounds per inch of nip.

A second laminate was prepared by assembling a layer of the treated film of Example 1 between two layers of the non-woven fabric of Example 1, and calendering at 300° F. and a pressure of 300 pounds per inch of nip.

To allow adequate time for the adhesive-based sample to cure, both samples were stored for one week, after which they were tested for dielectric strength, with the following result:

| | Total Dielectric Strength | Thickness, Mils | Dielectric Strength per Mil of Thickness |
|---|---|---|---|
| Acid-treated film laminate | 14,100 | 13 | 1,084 |
| Resin-adhesive laminate | 11,300 | 15 | 753 |

Laminates prepared from the film of my invention not only have a higher dielectric strength than adhesive-based laminates, but the difference is even more marked when the dielectric strength per unit of thickness is measured. This is important in applications where maximum dielectric value should be combined with minimum bulk.

*Example 3*

A sample of Mylar film, 0.003 inch thick, was treated with sulfuric acid and quenched as described in Example 1. The film thus treated was made into a sandwich with electrical grade kraft paper, described as capacitor insulation by the manufacturer, Hollingsworth & Vose Company, and a sandwich thus formed was passed through the calender as described in Example 1. The paper adhered tenaciously to the Mylar film and when attempts were made to remove the paper from the film, the surface of the paper was destroyed and remained on the surface of the treated Mylar. Additional quantities of the same film were made into sandwiches using an asbestos paper called Quintera produced by the Johns-Manville Company. The sandwich thus formed was passed through the calender as previously described and the asbestos was tenaciously held to the surface of the Mylar film. The asbestos paper could not be removed from the Mylar film without the destruction of the paper. Additional quantities of acid-treated film were made into sandwiches as previously described with cotton print cloth. The sandwich thus formed was passed through the calender at temperatures as previously described. The print cloth held tenaciously to the surface of the non-woven fabric and some fibers were removed when attempts were made to separate the cloth from the surface of the Mylar film.

*Example 4*

Sample rolls of Mylar film, 0.003 inch thick, were prepared by treating with sulfuric acid and quenching as described in Example 1. A roll of treated film and a roll of 0.003 inch thick untreated film were passed through the nip of a textile calender heated to 250° F., under a pressure of 300 pounds per inch. The two films were heat-sealed together so that a force of between 3 and 4 pounds per two inch strip was required to rupture the bond and separate the films.

Even more strongly bonded laminates are made when all the rolls of film have been treated according to my invention. When two, three, four, or five such films are calendered together in a single pass through a calender operating as above, laminates are formed in which it is impossible to separate one layer of film from another. In this maner, autogenously-bonded laminates of polyester film can be readily built up to a desired thickness, without resorting to film-casting or to the use of adhesive systems. Such relatively rigid films are useful as wedge and slot liners for hermetic motors, and for similar uses.

DISCUSSION

As set forth above, prolonged action of concentrated sulfuric acid on polyethylene terephthalate film leads to a substantial reduction in molecular weight. Such prolonged action might also be postulated to result in chemical alteration of the polymer, or of its degradation products. Due to the relatively brief exposure in the process of my invention, however, I believe that there is minimal chemical alteration of the nature of the polymer. Although some hydrolysis of the polymer chain probably takes place, the infra red spectral analysis tracings, reproduced in FIGURES 3 and 4, point to a strong chemical similarity between the untreated film substance and the substance of the film surface after treatment in accordance with the process of my invention.

Figure 3:
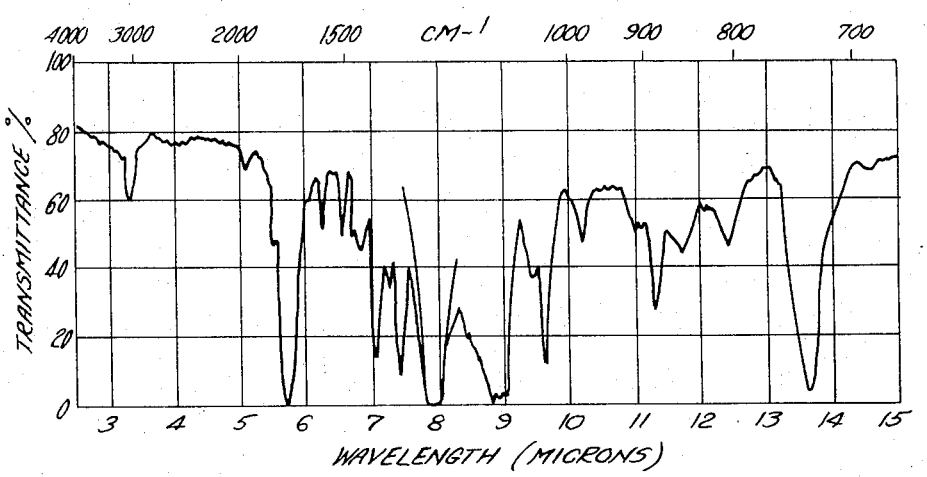
FIGURE 3 is a tracing of the infrared spectrum of the original film substance, or untreated polyester, of FIGURE 1.
Figure 4:
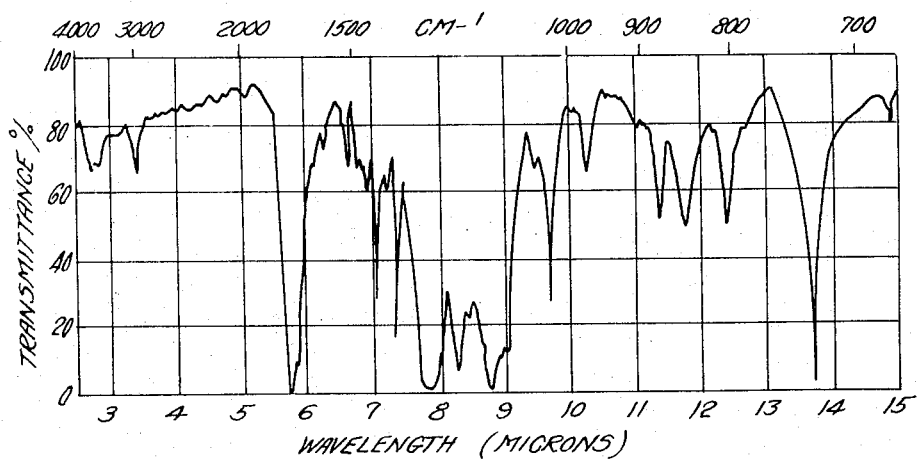
FIGURE 4 is a tracing of the infrared spectrum of the surface substance created on the film by the process of my invention, being characteristic of the treated surface portion of the film.

Notwithstanding this chemical similarity, the material of FIGURE 3 is not heat-sealable at 400° F., whereas the material of FIGURE 4 can be readily heat-sealed at much lower temperatures. The striking difference between the two materials, I believe, is due to a difference between two physical states of aggregation of the same polymer, and not due to the formation of a chemically different material with an inherently lower melting point or broader softening range.

The apparent immediate effect of concentrated sulfuric acid on Mylar film is to form a viscous solution of polyethylene terephthalate in acid. In such a solution, the characteristic crystallinity which the molecular species displayed in the oriented film is lost. It may be postulated that polymer molecules are dispersed throughout the solution in random arrangement and with little or no degree of order or orientation, since the orientation of crystalline materials disappears when the molecules of the material pass into solution. When the molecules of polymer are rapidly thrown out of solution, by the quenching process of my invention, there is apparently little or no degree of reorientation or recrystallization. The polymer which had passed into solution is reformed in an amorphous state, chemically very similar to the original film but with a much lower softening point. At the same time, due perhaps to the chemical similarity mentioned above, the amorphous material clings very tenaciously to the surface of the film in the form of a closely-adherent white opaque deposit.

I have found that some latitude or variation is possible in the nature of the quenching bath used to cast down the treated surface of the film in a desirable form. Although the water-ammonia-water sequence set forth above is a preferred example for continuous processing, hand samples are readily prepared by dipping the film in reactive acid, quenching in dilute ammonia, rinsing in water, and drying.

For the development of maximum smoothness in the surface deposit created on the film, the first quenching bath after the solubilizing acid bath may be of 50% sulfuric acid. It is also possible to slow down the reprecipitation of the polymer—i.e., to create a fine-grained surface—by quenching in a 10% solution of sodium sulfate. An additional controllable variable is the temperature of the quench bath: a fine-grained surface effect is promoted by quenching baths of low temperature, down to 0° C., while the thickness and coarseness of the surface alteration is encouraged by quenching the acid-treated film in a bath heated to 60 or 70° C.

I have also found that the characteristic white surface deposit is formed when the acid-treated film is quenched in methyl or ethyl alcohol. When materials inert to sulfuric acid, such as dichloromethane or carbon tetrachloride, are used as a quench, the film is generally not rendered heat-sealable.

The state of aggregation of this white, opaque amorphous deposit—i.e., its "grain"—can be controlled by variation in the nature of the quenching bath, as indicated above. If the quenching bath is a strong base, the neutralization of the acid-polymer solution on the surface of the film is accompanied by the evolution of considerable heat. This heat, in fact, is apparently enough to cause the local evolution of steam as the dissolved polymer is being cast out of solution, so that the white amorphous surface deposit is simultaneously blown or expanded, creating a coarse-grained, almost spongy deposit. Such a blown or foamed surface is advantageous when the film is to be heat-sealed to another coarse-grained surface, such as a porous layer of coarse fibers, since the foamed film surface apparently deforms around coarse fibers to give a degree of physical interlocking by a sort of embedment process. On the other hand, as mentioned above, if the initial quench is a sulfuric acid bath held at 50% concentration, the reaction is much slower, less heat is evolved, and the amorphous surface of the film is very smooth, uniform, and fine grained.

Considerable control over the physical nature of the surface treatment, therefore, may be effected by control over the quenching bath. I have found that water, followed by 10% ammonium hydroxide, followed by water, all at room temperature, results in a medium-textured film surface suitable for a wide variety of heat-sealing applications, and such a process has been set forth as exemplary in my detailed description of the process, above.

PROMOTING ADHESION BETWEEN TREATED POLYESTER FILM AND AN ADDEND

The well-recognized difficulty in promoting better adhesion between the surface of a polyethylene terephthalate film and another substance has been attacked by various methods, such as described in U.S. Patent 3,022,192 to Brandt, in U.S. Patent 3,035,916 to Heiart, and in Patents 3,035,881 and 3,035,941 to Cohen et al. each of which relates to the treatment of the surface of a shaped polyester article with an acidic substance to promote better adhesion to other materials I have found that the surfaces of film treated in accordance with this invention are usefully apart from their utility in forming laminates under heat and pressure. When such a treated film is heated to 200° F., for a minute or two, the surface changes from a white, heavily opaque nature to a slightly hazy appearance, so that the whole film becomes quite translucent. This change is accompanied by a loss of the heat-sealing characteristics of the film, which during the heating process undergoes recrystallization. When this reconversion is effected while the amorphous surface of the film is in intimate contact with another sheet of material, under heat and pressure, a laminate results as set forth above. Advantage may also be taken of this invention in the affixing to, or encapsulating in, and amorphous surface of this type of a second material which is not necessarily in sheet or continuous form, but which may be particulate matter, semi-solid matter, or the like. This second substance, called here by the general term of addend, is by the process of this invention firmly bonded in or onto the polyester film surface, and may not readily be removed therefrom without destruction of the recrystallized film surface.

As a general statement of this aspect of the invention, I have found that if this heating process is carried out while the amorphous surface of an acid-treated film is impregnated at least in part with a second substance, as for example a pigment, an ink, or finely divided organic or inorganic matter, the recrystallization which occurs on heating will cause the entrapment or encapsulation of said matter so that it cannot readily be removed from the film surface. In this manner it is possible to bond securely to polyester surfaces a wide variety of substances for which a normal crystalline polyester surface has no affinity. Printed or pigmented legends can readily be developed on a polyester surface by the process of this invention: the surface may be made conductive by impregnating an acid-treated amorphous film with graphite, followed by heat-treatment; magnetic tapes may be made by the use of magnetic iron oxide in the impregnating step; and by suitable impregnation with sensitive dyes or silver salts, followed by recrystallization by heat, polyester films are prepared which are useful in the photographic arts.

The following examples will illustrate methods of carrying out the process of this invention.

*Example 5*

A sheet of Mylar film .003 inch thick was immersed in 96% sulfuric acid at room temperature for a period of five seconds, after which it was quenched in 10% ammonium hydroxide, rinsed with water, and dried, according to the procedure of Example 1, above. The surface of the dried film was chalky, white, and opaque.

A sample of the film was then impregnated by rubbing finely-divided dry ferric oxide onto the surface, and removing excess oxide by means of a gentle air stream. Half of the thus-impregnated film was then placed on the surface of a steam can heated to 220° F. for a period of 15 to 20 seconds, the other half of the film being left untreated.

Both halves of the film sample were then tumbled in warm soapy water for one or two minutes. The half of the film which had not been heat-treated lost practically all of its impregnant, being restored to a chalky white lusterless appearance with only an occasional trace of brown oxide resisting the washing effect. The half of the film which had been heat-treated, however, was colored reddish brown, had a lustrous surface, and was impregnated with a layer of ferric oxide which could not readily be washed off or rubbed off.

*Example 6*

A sheet of Mylar film .003 inch thick was acid-treated and quenched according to Example 1. The surface was found to accept water-based inks and paints quite readily, in contrast to the water-repellent nature of the original film.

A design and legend was drawn on a sample of the treated film, using a water-base ink known as Sheaffer's Washable Blue Skrip. The blue design and legend was prominent against the white opaque film.

The marked sample was cut into two parts. One part was heated on the surface of a steam-heated dry can at about 220° F. for about 5 seconds, the second part being reserved untreated. The heated part of the film changed from opaque white to nearly transparent, and became shiny and lustrous. Both pieces of film were then tumbled gently in warm soapy water. The design and legend on the opaque reserved piece of the film was rapidly washed away, only a faint trace remaining after the film was rinsed and dried. There was substantially no bleeding from the piece of film which had been heated, and the design and legend remained clear, prominent, and firmly affixed in the surface of the film.

I have found that recrystallization by heat of amorphous polyester film surfaces is a time-temperature dependent reaction. At temperatures around or below the boiling point of water, the disappearance of the chalky aspect and the development of translucency may take one or two minutes. At temperatures of 220°–250° F., the reaction is complete in a few seconds. Care should be taken to avoid temperatures in the neighborhood of 240°–250° C., since the film undergoes a transition in that range, with shrinkage and distortion.

It will be apparent that the process of this phase of the invention has several advantages. First, it allows clear outlines of decorative or informative matter, composed of water-dispersed dyes or pigments, to be applied to the surface of a polyester film which in its normal crystalline and biaxially oriented form would not receive such matter. Second, it allows the conversion of such an imprinted film to a nearly transparent state, in which the imprint is firmly fixed into the surface of the film, without the use of extraneous binders or adhesives. This nearly transparent state is marked by the return of the substance of the film surface to a crystalline state, in which state it is not heat sensitive and is highly resistant to the effects of most common organic solvents.

Having thus described my invention, I claim:

1. A process for incorporating a modifying addend into the surface of a shaped article composed at least in part of highly crystalline polyethylene terephthalate which comprises exposing said surface to the action of an acidic substance chosen from the class consisting of chlorosulfonic acid and sulfuric acid of at least about 85% concentration for a period of not more than 300 seconds, arresting the action of the acid substance by quenching the surface-treated article in an aqueous medium, whereby a white opaque deposit of amorphous polyethylene terephthalate is formed on said surface, impregnating the amorphous surface with said modifying addend, recrystallizing the impregnated amorphous surface, and encapsulating the modifying addend into the surface of said article.

2. The process according to claim 1 wherein the recrystallization is effected by heating the amorphous surface of said shaped article, with said modifying addend incorporated therein, to a temperature above 220° F. but below about 250° C.

3. A process for altering the nature of the surface of a shaped article composed at least in part of crystalline polyethylene terephthalate by the incorporation into said surface of a modifying addend which comprises exposing said surface to the action of an acidic substance chosen from the class consisting of chlorosulfonic acid and sulfuric acid of at least about 85% concentration arresting the action of the acidic substance by quenching the surface treated article, whereby the surface is rendered amorphous, impregnating said amorphous surface with a modifying addend, recrystallizing the amorphous surface impregnated with said modifying addend, and encapsulating said addend into said surface by recrystallized polyethylene terephthalate.

4. The process according to claim 3 wherein the modifying addend is a finely-divided particulate solid.

5. The process according to claim 3 wherein the modifying addend is a fluid dispersion of a substance possessing tinctorial power.

6. A shaped article according to the process of claim 3 composed at least in part of crystalline polyethylene terephthalate having a modifying addend encapsulated in its surface.

7. A shaped article as claimed in claim 6 wherein the addend is a particulate solid.

8. A shaped article as claimed in claim 6 wherein the addend is a dispersion of a substance possessing tinctorial power.

9. A process for producing heat-sealed laminate which comprises exposing the surface of a polyethyleneterephthalate film for a period of not more than about 300 seconds to the dissolving action of an acid chosen from the class which consists of sulfuric acid and chlorosulfonic acid, quenching the treated film in an aqueous fluid to reprecipitate the dissolved film substance in an altered physical state of aggregation, and combining the treated film with at least one other sheet of material by the use of heat and pressure.

10. The process according to claim 9 in which the other sheet of material is a non-woven fabric.

11. The process according to claim 9 in which the other sheet of material is paper.

12. The process according to claim 9 in which the other sheet of material is a woven fabric.

13. The process according to claim 9 in which the other sheet of material is a film.

14. A process for producing a heat sealed laminate which comprises exposing the surface of a polyethylene terephthalate film to the action of sulfuric acid of at least about 85% concentration at room temperature for a period of not more than 300 seconds, arresting the action of the sulfuric acid by quenching the surface-treated film in an aqueous medium, washing residual acid from the film surface, and combining the treated film with at least one other sheet of material by the use of heat and pressure.

15. The process according to claim 14 in which the other sheet is a non-woven fabric.

16. The process according to claim 14 in which the other sheet is paper.

17. The process according to claim 14 in which the other sheet is a woven fabric.

18. The process according to claim 14 in which the other sheet of material is a film.

References Cited
UNITED STATES PATENTS

| | | | |
|---|---|---|---|
| 2,820,735 | 1/1958 | Edward | 156—308 |
| 2,849,359 | 8/1958 | Smith | 156—308 |
| 2,961,365 | 11/1960 | Sroog | 161—232 X |
| 3,035,915 | 5/1962 | Cohen et al. | 117—47 X |
| 3,035,916 | 5/1962 | Heiart | 117—47 X |
| 3,142,582 | 7/1964 | Koretzky | 117—47 |

EARL M. BERGERT, *Primary Examiner.*

J. P. MELOCHE, *Assistant Examiner.*